United States Patent [19]
Barbier et al.

[11] Patent Number: 6,126,811
[45] Date of Patent: Oct. 3, 2000

[54] ELECTROCATALYTIC METHOD FOR THE DEOXYGENATION OF SEA WATER AND DEVICE FOR ITS IMPLEMENTATION

[75] Inventors: Jacques Barbier, Montanise; Jacques Bousquet, Irigny; Gérard Valentin, Malzeville; Alain Storck, Nancy, all of France; Hans-Günther Lintz, Karlsruhe; Peter Kinzel, Neustadt, both of Germany

[73] Assignee: Elf Exploration Production, Courbevoie, France

[21] Appl. No.: 09/153,767

[22] Filed: Sep. 15, 1998

[30] Foreign Application Priority Data

Jan. 21, 1997 [FR] France .................. 97 00564

[51] Int. Cl.⁷ .............. C02F 1/461; C02F 1/20; C25B 9/00; B01D 57/02
[52] U.S. Cl. .............. 205/746; 205/753; 205/760; 204/554; 204/253; 204/257; 204/263; 204/666; 204/672
[58] Field of Search ............... 205/753, 754, 205/758, 759, 752, 348, 746, 760; 204/554, 257, 263, 666, 672, 253

[56] References Cited

U.S. PATENT DOCUMENTS

| | | | |
|---|---|---|---|
| 3,953,517 | 4/1976 | Schmitt et al. | 568/396 |
| 3,966,571 | 6/1976 | Gagnon et al. | 205/744 |
| 3,969,201 | 7/1976 | Oloman et al. | 205/348 |
| 4,292,197 | 9/1981 | Chamberlin | 502/101 |
| 4,527,626 | 7/1985 | Cantu et al. | 166/275 |
| 4,830,721 | 5/1989 | Bianchi et al. | 210/748 |
| 4,981,563 | 1/1991 | Spaziante et al. | 204/128 |
| 5,340,458 | 8/1994 | Koizumi | 204/253 |

FOREIGN PATENT DOCUMENTS

| | | |
|---|---|---|
| 0 276 789 | 8/1988 | European Pat. Off. . |
| 0 311 575 | 4/1989 | European Pat. Off. . |
| WO93/24412 | 12/1993 | WIPO . |

*Primary Examiner*—Kathryn Gorgos
*Assistant Examiner*—Thao Tran
*Attorney, Agent, or Firm*—Schnader Harrison Segal & Lewis LLP

[57] ABSTRACT

The invention concerns a method consisting: in passing the sea water through an electrically conductive catalyst (10), arranged in the cathode section of an electrolytic cell (1), comprising a cathode section (3) and an anode section (4) provided with, the former, with at least one cathode (11a, ...) and, the latter, with at least one anode (18) and separated by a wall (2) permeable only to the cations and in circulating, in the anode section (4), a conductive aqueous solution of a particular anolyte; in providing an electric voltage between the cathode and the anode of the cell (1) while maintaining the contents of the cathode and the anode sections at specific potentials, so as to produce, in the cathode section, consumption of oxygen dissolved in the treated water and in decomposing, in the anode section, an appropriate amount of solution for ensuring the electroneutrality of the treated water.

27 Claims, 3 Drawing Sheets

ELECTROCATALYTIC METHOD FOR THE DEOXYGENATION OF SEA WATER AND DEVICE FOR ITS IMPLEMENTATION

The invention relates to an electrocatalytic process for the deoxygenation of water from various sources and very particularly of sea water. It also relates to a device for the implementation of this process.

The maintenance under pressure of oil deposits, in particular marine deposits, and/or the improved recovery of oil result in offshore oil producers injecting sea water into the deposit during exploitation. Such a process requires that this water be treated before injection into the deposit. This is the reason why, generally, a bactericidal treatment is first of all carried out, for example by chlorination, and then a filtration in several stages is carried out, so as to remove any suspended matter which can cause possible blockages in the device for injection of the sea water, as well as in the deposit and in the production wells. Finally, an exhaustive deoxygenation of the sea water has to be carried out after filtration, without which there would be reason to fear that the risks of corrosion of the equipment would be very high, with the financial consequences which may be imagined.

The techniques conventionally used in carrying out the abovementioned deoxygenation of sea water are stripping by oxygen-free gases or placing under reduced pressure. These two techniques are today proven and successful because they make it possible to achieve, without difficulty, a residual oxygen content in the treated sea water which is of the order of 50 ppb (1 ppb=$1 \times 10^{-7}$% by weight).

These techniques also have some intrinsic disadvantages. It is known, for example, that stripping by gases always slightly acidifies the water because of the $CO_2$ always present. Furthermore, the traces of oil entrained in the stripping gas, in spite of the most high-performance techniques for removing oil droplets, can present blockage problems throughout the production equipment. The introduction of vacuum degassing towers does not present difficulties of this type but has, on the other hand, the disadvantage of employing rotating machines, the maintenance of which has to be assured and the operation of which demands the installation of structures which are particularly expensive at sea.

A technique which exhibits numerous advantages with respect to the techniques mentioned above was disclosed by the Applicant Company in the citation WO-A-9524360. This consists in removing the oxygen contained in sea water by carrying out a catalytic hydrogenation of this water, by hydrogen introduced from an external source, in contact with a solid catalyst comprising divided platinum in combination with a granular support of active charcoal. There may be remembered, among the advantages offered by such a technique with respect to conventional techniques for the deoxygenation of sea water, in particular the high compactness of the plant, the absence of rotating machines, and the absence of risks of foaming in the columns or of risks of blockage in the wells, all this in addition to the fact that the amount of hydrogen required in the process is very low.

On pursuing its research, the Applicant Company has found that the catalytic hydrogenating deoxygenation of sea water could be further improved by still bringing the catalyst and the sea water into contact in a reactor, as in the case of the technique of the abovementioned citation, but this time without external addition of hydrogen and while maintaining the catalyst, immersed in the water, under the influence of an electric field.

The citation U.S. Pat. No. 4,527,626 discloses a process for the removal of the oxygen contained, in the dissolved state, in saline water, in particular in sea water, which involves an electrolysis of the water to be treated, in order to produce hydrogen, and then a catalytic hydrogenation of the dissolved oxygen by the hydrogen resulting from the electrolysis. More specifically, in the said process, the water to be treated is filtered, in order to remove the solid matter suspended in the water, the filtered water is then electrolysed, the electrolysis being carried out in an electrolysis cell comprising a cathode compartment and an anode compartment separated by a wall permeable to the fluids, in order to produce hydrogen at the cathode and chlorine at the anode of the electrolysis cell, and, finally, the stream of water charged with hydrogen, exiting from the cathode compartment of the electrolysis cell, is brought into contact with a catalyst based on a metal from Group VIII of the Periodic Table of the Elements, in particular palladium, in the finely divided state, so as to bring about the reaction between the hydrogen and the oxygen which are contained in the water in contact with the said catalyst and thus to bring about removal of the oxygen dissolved in this water.

The process according to the invention is distinguished from the process of the citation U.S. Pat. No. 4,527,626 in that the generation of the electric field in the stream of water and the operation of bringing the stream of water, subjected to the action of the electric field, into contact with the catalyst are carried out simultaneously in the same reaction volume by resorting to a specific operation which, inter alia, avoids the production of chlorine. The process according to the invention is more compact than the process of the citation and, in treating the same flow rate of water with the same degree of deoxygenation, it consumes less electrical energy and uses a reduced amount of catalyst.

The subject-matter of the invention is thus an electrocatalytic process for the deoxygenation of water from various sources and very particularly sea water, of the type in which an electric field is generated in a stream of the water to be treated and the said stream of water, subjected to the action of the electric field, is brought into contact with a catalyst for the reduction of oxygen, the said process being characterized in that the generation of the electric field in the stream of water and the operation of bringing the stream of water, subjected to the action of the electric field, into contact with the catalyst are carried out simultaneously in the same reaction volume by passing the stream of water to be treated continuously through a bed of the catalyst placed in the cathode compartment of an electrolytic cell which comprises a cathode compartment and an anode compartment which are provided, in the case of the former, with at least one electrode operating as a cathode and, in the case of the latter, with at least one electrode operating as an anode and which are separated by a wall permeable only to cations, the said catalyst being electrically conducting, and in that a conductive aqueous solution of an anolytic component composed of at least one compound chosen from alkali metal hydroxides, acids and alkali metal or alkaline earth metal salts is passed continuously into the anode compartment of the electrolytic cell, the said aqueous solution having a concentration of anolytic component of between 0.01 mol and 5 mol per liter and more particularly between 0.05 mol and 2 mol per liter, and an electric potential is established between the cathode and the anode of the electrolytic cell by maintaining the local electrode potential of the cathode compartment at values, with respect to the standard hydrogen electrode, of between +0.3 volt and −2 volts, preferably between 0.0 volt and −1.0 volt, in order to consume, in this compartment, the oxygen dissolved in the stream of water being treated, and under conditions such that the potential of the anode compartment takes values, with respect to the standard hydrogen electrode, greater than 0.4 volt and preferably of between 0.4 volt and 2 volts, in order to decompose an amount of the aqueous anolytic component solution appropriate for allowing the passage, into the cathode compartment, of the required amount of cations for ensuring the electrical neutrality of the treated stream of water exiting from the cathode compartment.

The catalyst used in the process according to the invention can comprise an active phase which comprises at least one metal and which is deposited on an electrically conducting support. The active phase of the catalyst is advantageously based on at least one metal chosen from iron, platinum, palladium, rhodium and iridium. The support of the catalyst with the supported active phase is made of a material which is electrically conducting and stable under the conditions of implementation of the process. The said material can be chosen in particular from products such as active charcoal, graphite, mixtures of active charcoal and of graphite, cokes, coal or petroleum pitches, silicon carbide, heavy metal carbides, such as tungsten carbide, silicon nitride, heavy metal nitrides, such as tungsten nitride, or metals and metal alloys, for example stainless steel. The support of the catalyst can be provided in various forms, such as, for example, grains, beads, monoliths, grids or more or less fine powders. It is also possible to resort to a catalyst composed essentially of carbon and in particular of active charcoal and which is provided in one or other of the forms specified above for the support of the catalyst with an active phase.

The amount by weight of the metal or metals in the catalyst with a supported active phase can vary fairly widely and can range, for example, from 0.01% to 5% of the weight of the catalyst. The said amount advantageously represents 0.05% to 5% and preferably 0.1% to 2% of the weight of the catalyst.

The process according to the invention can be carried out, in particular, by resorting to the catalyst based on divided platinum on a granular support of active charcoal which is disclosed in the citation WO-A-9524360.

As indicated above, the anolytic component present in the conductive aqueous solution contained in the anode compartment is composed of at least one compound chosen from alkali metal hydoxides, acids and alkali metal or alkaline earth metal salts.

The alkali metal hydroxides correspond to the general formula MOH, in which M represents an alkali metal, in particular sodium, potassium or lithium. In particular, the hydroxide MOH is chosen from sodium hydroxide and potassium hydroxide and very especially consists of sodium hydroxide.

The acids among which is chosen the anolytic component of acid type must be stable under the operating conditions of the anode compartment of the electrolytic cell and non-aggressive with respect to the cation-permeable wall. These acids can be inorganic monoacids or polyacids, such as, for example, perchloric acid, sulphuric acid, boric acids or phosphoric acids, in particular orthophosphoric acid, or else organic monoacids or polyacids, such as, for example, formic acid, acetic acid or trichloroacetic acid.

The alkali metal or alkaline earth metal salts can be in particular the alkali metal or alkaline earth metal salts of the abovementioned acids and in particular the sodium or potassium salts of the said acids.

According to a preferred embodiment, the anolytic component is very specially chosen from sodium or potassium hydroxide, orthophosphoric acid, perchloric acid and the sodium or potassium salts of the said acids.

According to the invention, a potential difference is established between the cathode and the anode of the electrolytic cell by imposing a potential in the cathode compartment, which comprises the catalyst for reduction of the oxygen, through which passes the stream of water to be treated, and a potential in the anode compartment, through which passes the aqueous solution of the anolytic component, which take, with respect to the standard hydrogen electrode (SHE), specific values situated in the ranges defined above. The maintenance of these potentials results, in the cathode compartment, in the consumption, by conversion into water, of the oxygen dissolved in the stream of water to be treated and, in the anode compartment, in the formation of oxygen and release of an equivalent amount of cations, which are available to pass through the cation-permeable wall and thus ensure the electrical neutrality of the stream of water passing through the cathode compartment.

When the potential imposed in the cathode compartment is between 0.3 volt and −0.3 volt and preferably between 0.0 volt and −0.3 volt with respect to the standard hydrogen electrode (SHE), the dissolved oxygen is consumed according to the overall scheme (I) below:

$$O_2+4H^++4e^-\rightarrow 2H_2O$$

When the potential imposed in the cathode compartment is between −2 volts and −0.3 volt and preferably between −1.6 volts and −0.3 volt with respect to SHE, the consumption of the dissolved oxygen involves the reaction scheme (II) below:

$$2H^++2e^-\rightarrow 2 \text{ adsorbed H (on the catalyst)}$$

$$2 \text{ adsorbed } H+\tfrac{1}{2}O_2\rightarrow H_2O$$

In the anode compartment, for an aqueous solution of an alkaline anolytic component, at potentials greater than 0.4 volt and more especially of between 0.4 volt and 2 volts and very especially between 0.4 volt and 0.9 volt with respect to SHE, defined by the hydroxide concentration, the hydroxide ions are decomposed with production of oxygen according to the reaction scheme (III) below:

$$2OH^-\rightarrow \tfrac{1}{2}O_2+H_2O+2e^-$$

For an aqueous solution of an acidic or neutral anolytric component, the reaction in the anode compartment corresponds to the decomposition of water with production of oxygen according to the reaction scheme (IV) below:

$$H_2O\rightarrow \tfrac{1}{2}O_2+2H^++2e^-$$

According to one embodiment of the process according to the invention, the solution of the anolytic component which passes through the anode compartment moves in a closed circuit from the anode compartment, passing through a degassing region in which it is freed from the oxygen produced during the decomposition in the anode compartment, in order to return to the said compartment. The concentration of anolytic component is advantageously kept constant in the anode compartment, for example by addition of a supplementary amount of the said component to the degassed solution recycled to the anode compartment. The circulation of the solution of the anolytic component in the anode compartment is preferably carried out countercurrentwise to the movement of the stream of water to be treated passing through the cathode compartment.

The cation-permeable wall which separates the cathode and anode compartments can be in particular a wall of the mechanical separator type, such as a ceramic wall, or alternatively a wall of the cation-exchange polymer membrane type, such as, for example, an ion-exchange membrane of the Nafion type.

The difference in potential or voltage established between the cathode and the anode of the electrolytic cell during the implementation of the process according to the invention can have a constant value or, in contrast, a value which varies as a function of time. It is possible, in particular, to operate so that the said potential varies cyclically, continuously or non-continuously, as a function of time, that is to say that the potential signal applied between cathode and anode is the constant or intermittent repetition of a basic signal.

The treatment of the water in the electrolytic cell is advantageously carried out at temperatures of between 0° C. and 50° C. and more particularly between 4° C. and 30° C.

A device for the implementation of the process according to the invention is of the type comprising at least one electrolytic cell comprising a cathode compartment and an anode compartment which are separated by a cation-permeable wall, the cathode compartment being provided with an inlet connected to a pipe for introduction of the water to be treated and with an outlet connected to a pipe for discharge of liquid and being equipped with at least one electrode suitable for acting as cathode and the anode compartment being provided with a pipe for introduction of liquid and with a pipe for discharge of liquid and being equipped with at least one electrode suitable for acting as anode, the cathode compartment of the electrolytic cell additionally comprising a bed of a catalyst for the reduction of oxygen which is placed between the inlet and outlet of the cathode compartment and which is composed of carbon, in particular active charcoal, or of a catalyst composed of an active phase which comprises at least one metal and which is deposited on an electrically conducting support.

In one embodiment, the device additionally comprises a degassing vessel provided with an inlet and with an outlet for the liquids and, at the top, with an outlet for the gases, the said inlet and outlet for the liquids being connected, respectively, to the pipe for discharge and to the pipe for introduction of liquid equipping the anode compartment.

A pipe for introduction of a supplementary liquid is advantageously fitted as a branch pipe on the pipe for introduction of liquid to the anode compartment.

Preferably, the pipe for introduction of liquid equipping the anode compartment of the electrolytic cell is arranged on the same side of the said cell as the pipe for discharge of water equipping the cathode compartment, whereas the pipe for discharge of liquid from the anode compartment is situated on the side of the pipe for introduction of water equipping the cathode compartment, with the result that the water passing through the cathode compartment moves countercurrentwise to the liquid passing through the anode compartment.

The electrodes and associated current leads equipping the cathode and anode compartments of the electrolytic cell are made of an electrically conducting material which is inert with respect to reaction mixtures present in the cathode and anode compartments, for example graphite paper or carbon, as regards the current leads, or stainless steel, for the cathode. These current-conveying electrodes can advantageously be provided in the form of perforated or non-perforated plates or of grids arranged parallel to the cation-permeable wall separating the anode and cathode compartments of the electrolytic cell. However, other arrangements can also be envisaged, in particular, although less efficient, an arrangement where the current-conveying electrodes are perpendicular to the said cation-permeable wall.

The device according to the invention can comprise a plurality of electrolytic cells, each cell comprising a cathode compartment and an anode compartment which are separated by a cation-permeable wall, the cathode compartment being provided with an inlet connected to a pipe for introduction of the water to be treated and with an outlet connected to a pipe for discharge of liquid and being equipped with at least one electrode suitable for acting as cathode and the anode compartment being provided with a pipe for introduction of liquid and with a pipe for discharge of liquid and being equipped with at least one electrode suitable for acting as anode, the cathode compartment of the electrolytic cell additionally comprising a bed of a catalyst for reduction of oxygen which is placed between the inlet and the outlet of the cathode compartment and which is composed of carbon, in particular active charcoal, or of a catalyst composed of an active phase which comprises at least one metal and which is deposited on an electrically conducting support. In this case, the electrolytic cells operate in parallel, the pipes for introduction of water to be treated and the pipes for discharge of treated water, which are connected respectively to the inlets and to the outlets of the cathode compartments of the cells, are connected, in the case of the former, to a common pipe for supplying with water to be treated and, in the case of the latter, to a common pipe for discharge of treated water, whereas the pipes for introduction of liquid and the pipes for discharge of liquid equipping the anode compartments of the said cells are connected, in the case of the former, to a common pipe for introduction of anodic liquid and, in the case of the latter, to a common pipe for discharge of anodic liquid and, in addition, the electrodes (cathodes) of the cathode compartments and the electrodes (anodes) of the anode compartments can be connected, in the case of the former, to the negative pole and, in the case of the latter, to the positive pole of an appropriate current generator.

The multi-cell device can also comprise, in addition, a degassing vessel provided with an inlet and with an outlet for the liquids and, at the top, with an outlet for the gases, the said inlet and the said outlet for the liquids being connected, respectively, to the common pipe for discharge and to the common pipe for introduction of anodic liquid. A pipe for introduction of a supplementary liquid can also be fitted as a branch pipe on the common pipe for introduction of anodic liquid.

Each cell of the multi-cell device can advantageously be provided in the form of a parallelepiped with a thickness t which is slight in view of its length l and its width w, the cation-permeable wall separating the cathode and anode compartments of the cell being arranged parallel to the main faces of the parallelepiped, while the main face on the side of the cathode compartment is arranged in order to constitute a cathode and while the main face on the side of the anode compartment is arranged in order to form an anode and while the parallelepipedal cells are joined together main face against main face, so that the adjacent compartments of two consecutive cells are of the same nature, that is to say both cathode compartments or both anode compartments.

The length l, width w and thickness t of each parallelepipedal cell can be chosen so that the ratio w:l is between 0.1:1 and 1:1 and that the ratio t:l is between 0.005:1 and 0.1:1 and more particularly between 0.01:1 and 0.05:1.

BRIEF DESCRIPTION OF THE DRAWINGS

Other characteristics and advantages of the invention will become more fully apparent on reading the following description of two of its embodiments presented with reference to the appended drawing, in which FIG. 1 diagrammatically represents a device according to the invention of the type with a single electrolytic cell for the deoxygenation of sea water.

Figure 1:
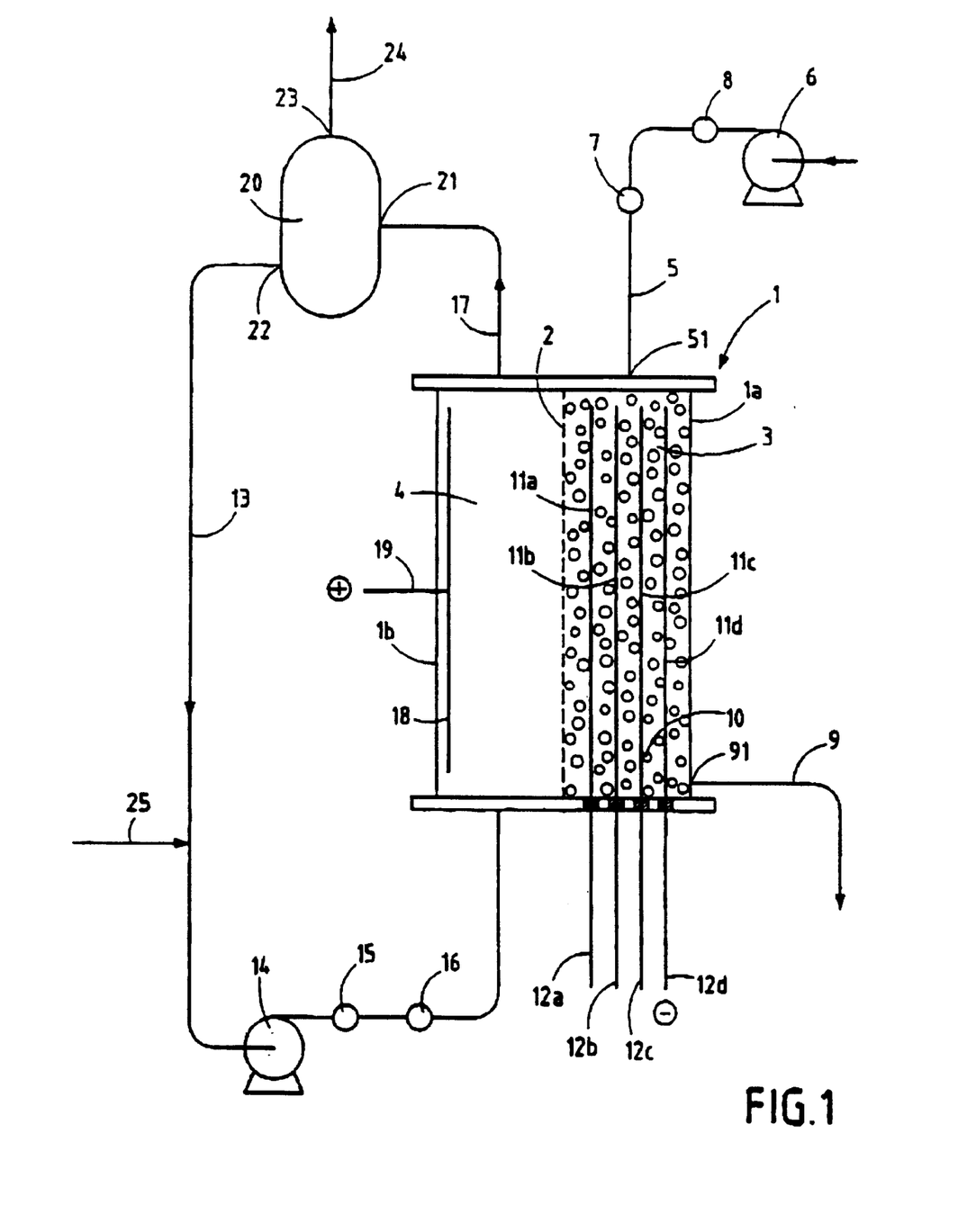

With reference to FIG. 1, the device represented diagrammatically comprises an electrolytic cell 1 forming an electrocatalytic reactor which is provided in the form of a parallelepiped, with main faces 1a and 1b, and is divided by a wall 2, which is permeable only to cations and which is parallel to the said main faces, into a cathode compartment 3 and an anode compartment 4. The length l, width w and thickness t of the electrolytic cell are such that the ratios w:l and t:l have values within the ranges given above. The cathode compartment of the cell is provided, at its upper part, with an inlet 51 connected to a pipe 5 for introduction of water to be treated, on which pipe are fitted a pump 6, a temperature regulator 7 and a flow regulator 8, and, at its low part, with an outlet 91 connected to a pipe 9 for discharge of treated water. The cathode compartment 3 comprises a bed of a catalyst for reduction of oxygen to water 10, in which are immersed, for example, four electrodes 11a, 11b, 11c and 11d made of a material suitable for constituting a cathode, the said electrodes being provided, for example, in the form of flat grids arranged parallel to the cation-permeable wall 2 and extended, out of the cell 1, by electrical current leads, respectively 12a, 12b, 12c and 12d. These current leads are connected to one another by a suitable set of resistors, not represented, which makes possible spatial adjustment of the potential in the cathode compartment to values situated within the ranges defined above and are connected, during operation of the device, to the negative pole of an appropriate current source. The anode compartment 4 of the electrolytic cell 1 is provided, at its lower part, with a pipe 13 for introduction of a liquid, in this instance an aqueous solution of an anolytic component such as, for example, NaOH, orthophosphoric acid, perchloric acid or alternatively sodium orthophosphate or perchlorate, on which pipe are fitted a pump 14, a flow regulator 15 and a temperature regulator 16, and, at its upper part, with a pipe 17 for discharge of liquid, in this instance an aqueous solution of the anolytic component. The anode compartment is further equipped with an electrode 18 made of a material suitable for constituting an anode, the said electrode being provided, for example, in the form of a plate or of a flat grid arranged parallel to the cation-permeable wall 2 and situated in the region of the wall 1b of the electrolytic cell. This electrode 18 is extended, out of the cell 1, by an electric current lead 19, which is connected, during operation of the device, to the positive pole of the current source. A degassing vessel 20, provided with an inlet 21 and with an outlet 22 for the liquids, in this instance an aqueous solution of anolytic component, and, at the top, with an outlet 23 for the gases extended by a pipe 24 for discharge of gas, is connected, via its inlet 21, to the pipe 17 for discharge of liquid equipping the anode compartment and, via its outlet 22, to the pipe 13 for introduction of liquid to the said anode compartment. A pipe 25 for introduction of a supplementary liquid, in this instance an aqueous solution of anolytic component, is fitted as a branch pipe on the pipe 13 for introduction of liquid to the anode compartment, upstream of the pump 14.

Figure 2:
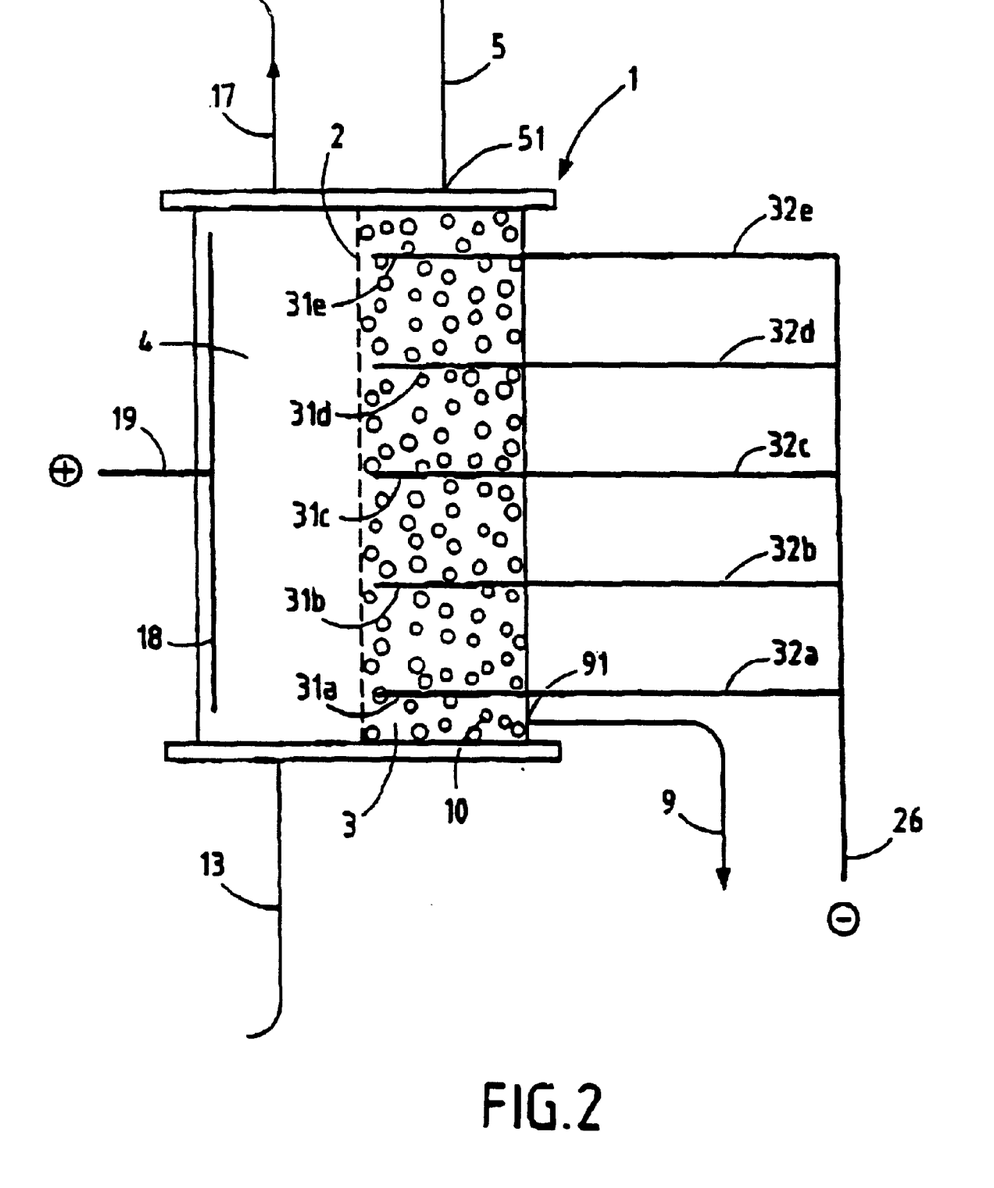
FIG. 2 diagrammatically represents an arrangement of the electrodes in the cathode compartment which constitutes an alternative to that of FIG. 1.

As represented diagrammatically in FIG. 2, which represents an alternative form of the electrolytic cell of FIG. 1 where the elements similar to those in FIG. 1 are denoted by the same numerical references, the electrodes of cathode type, which equip the cathode compartment 3 of the electrolytic cell 1 and are in this instance five in number, namely 31a to 31e, are still provided in the form of flat grids made of a material suitable for constituting a cathode but are now arranged, in the catalyst bed 10, perpendicular to the cation-permeable wall 2. Each of the electrodes of cathode type 31a to 31e is extended, out of the electrolytic cell 1, by a current lead, respectively 32a to 32e, connected, during operation of the device, to the negative terminal of the current source via a common electrical conductor 26.

Figure 3:
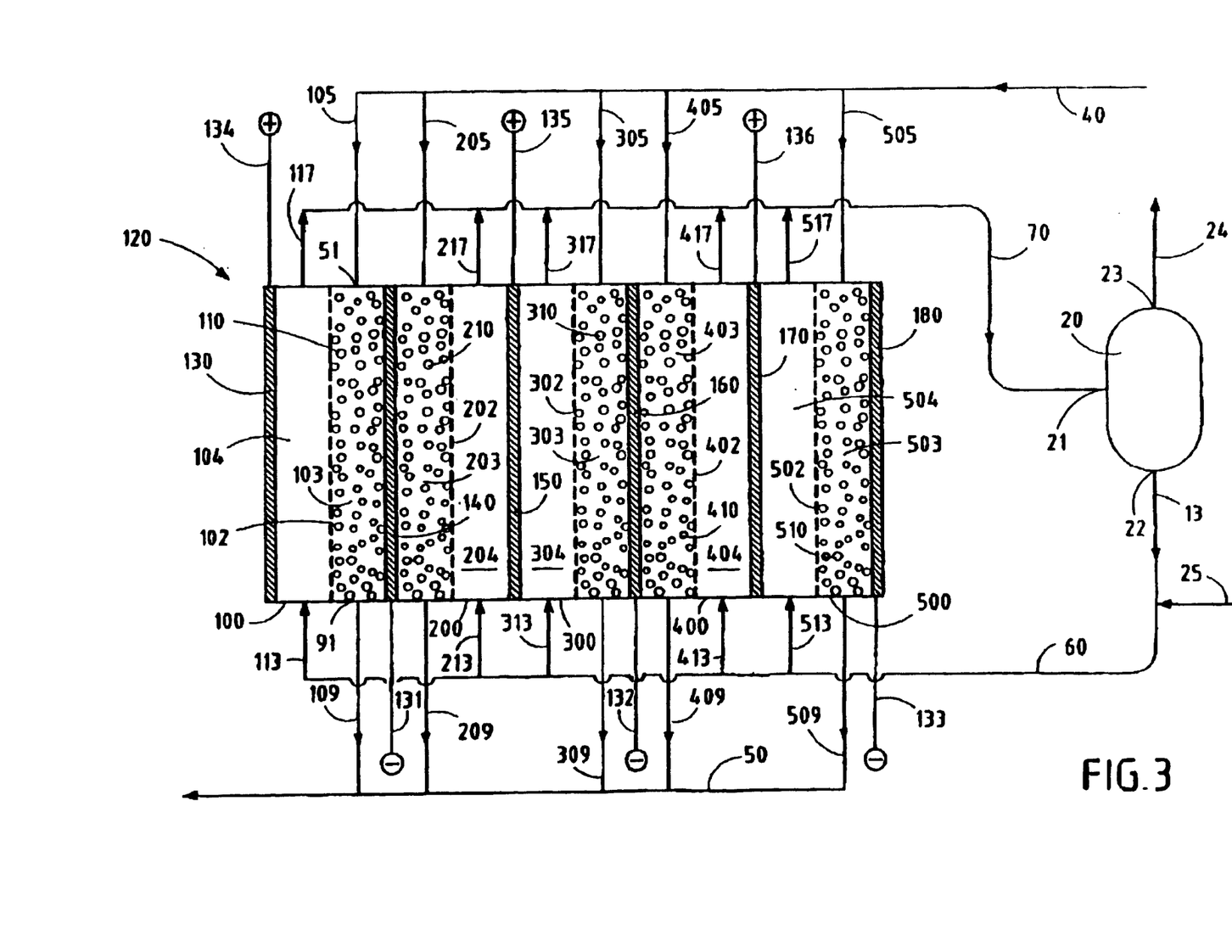
FIG. 3 diagrammatically represents a device according to the invention of the type with several electrolytic cells for the deoxygenation of sea water.

With reference to FIG. 3, the device represented diagrammatically comprises an electro-catalytic reactor 120, in parallelepipedal form, exhibiting two main faces 130 and 180 and divided, by four separations 140, 150, 160 and 170 parallel to the main faces 130 and 180, into five identical electrolytic cells in parallelepipedal form, namely cells 100, 200, 300, 400 and 500, arranged in parallel and of similar structure, which structure is similar to that of the electrolytic cell in FIG. 1. Each electrolytic cell, respectively 100, 200, 300, 400 and 500, is divided, by a wall parallel to the said main faces which is permeable only to cations, respectively 102, 202, 302, 402 and 502, into a cathode compartment, respectively 103, 203, 303, 403 and 503, and an anode compartment, respectively 104, 204, 304, 404 and 504. The length l, width w and thickness t of each of the electrolytic cells 100, 200, 300, 400 and 500 are such that the ratios w:l and t:l have values within the ranges given above. The cathode compartment, respectively 103, 203, 303, 403 and 503, of each electrolytic cell exhibits, at its upper part, an inlet, for example inlet 51 for the cathode compartment 103, connected to a pipe for introduction of water to be treated, respectively 105, 205, 305, 405 and 505, connected to a common pipe 40 for supplying with water to be treated, and, at its lower part, an outlet, for example outlet 91 for the cathode compartment 103, extended by a pipe for discharge of treated water, respectively 109, 209, 309, 409 and 509, emerging in a common pipe 50 for discharge of treated water. The common pipe 40 for supplying with water to be treated is equipped with a pump, a flow regulator and a temperature regulator, which are not represented. The anode compartment, respectively 104, 204, 304, 404 and 504, of each electrolytic cell is provided, at its lower part, with a pipe, respectively 113, 213, 313, 413 and 513, for the introduction of a liquid, in this instance an aqueous solution of an anolytic component, for example NaOH, orthophosphoric acid, perchloric acid or alternatively sodium orthophosphate or perchlorate, which pipe is connected to a common pipe 60 for supplying with the said liquid, and, at its upper part, with a pipe, respectively 117, 217, 317, 417 and 517, for the discharge of the liquid present in the anode compartment, the said pipe emerging in a common pipe 70 for discharge of anodic liquid. The supply pipe 60 is equipped with a pump, a flow regulator and a temperature regulator, which are not represented. The main face 180 of the cathode compartment 503 of the cell 500, as well as the separation 140 between the cathode compartments 103 and 203 of the cells 100 and 200, which are joined together, and the separation 160 between the cathode compartments 303 and 403 of the cells 300 and 400, which are joined together, are arranged in order each to constitute an electrode suitable for operating as a cathode, the separation 140 being a cathode common to the cells 100 and 200 and the separation 160 forming a cathode common to the cells 300 and 400.

Likewise, the main face 130 of the anode compartment 104 of the cell 100, as well as the separation 150 between the anode compartments of the cells 200 and 300, which are joined together, and the separation 170 between the anode compartments of the cells 400 and 500, which are joined together, are arranged in order each to constitute an electrode suitable for forming an anode, the separation 150 being an anode common to the cells 200 and 300 and the separation 170 forming an anode common to the cells 400 and 500. The cathode compartment, respectively 103, 203, 303, 403 and 503, of each cell, respectively 100, 200, 300, 400 and 500, is filled with a bed of a catalyst for the reduction of oxygen to water as defined above, respectively 110, 210, 310, 410 and 510. The electrodes 140, 160 and 180 acting as cathodes are extended, out of the associated cells, by current leads, respectively 131, 132 and 133, connected during operation of the device to the negative terminal of an appropriate current source. Likewise, the electrodes 130, 150 and 170 acting as anodes are extended, out of the associated cells, by current leads, respectively 134, 135 and 136, connected during operation of the device to the positive terminal of the current source. A degassing vessel 20, provided with an inlet 21 and with an outlet 22 for the liquids, in this case an aqueous solution of anolytic component, and, at the top, with an outlet 23 for the gases extended via a pipe 24 for discharging gas, is connected, via its inlet 21, to the common pipe 70 for discharge of anodic liquid and, via its outlet 22, to the common supply pipe 60. A pipe 25 for introduction of a supplementary liquid, in this instance an aqueous solution of anolytic component, is fitted as a branch pipe on the common supply pipe 60.

The progression of the process in the device with a single electrolytic cell in FIG. 1 or 2 or in the device with several electrolytic cells in FIG. 3 can be represented diagrammatically as follows:

By using an appropriate electric current generator, a potential difference is established between cathodes and anode of the electrolytic cell 1 of the device in FIG. 1 or 2 or of each of the cells, respectively 100, 200, 300, 400 and 500, of the electrocatalytic reactor 120 of the device in FIG. 3, which potential difference is suitable for maintaining the electric potential in the cathode compartment and in the anode compartment of each of the said electrolytic cells at values chosen within the ranges defined above. The water to be treated is introduced continuously, via the appropriate pipe, into the cathode compartment 3 of the electrolytic cell 1 of the device in FIG. 1 or 2 or into the cathode compartment, respectively 103, 203, 303, 403 and 503, of each of the electrolytic cells, respectively 100, 200, 300, 400 and 500, of the electrocatalytic reactor of the device in FIG. 3 and passes through the said cathode compartment, maintained at the appropriate potential, in contact with the catalyst present in this compartment, before being discharged from the cathode compartment via the discharge pipe equipping this compartment. An aqueous solution of anolytic component, for example NaOH, orthophosphoric acid, perchloric acid or alternatively sodium orthophosphate or perchlorate, is continuously introduced, via the appropriate pipe, into the anode compartment 4 of the electrolytic cell 1 of the device in FIG. 1 or 2 or into the anode compartment, respectively 104, 204, 304, 404 and 504, of each electrolytic cell, respectively 100, 200, 300, 400 and 500, of the catalytic reactor 120 of the device in FIG. 3 and passes through the said anode compartment, before being discharged, via the appropriate pipe, to the degassing vessel 20. The said solution is degassed in this vessel, before being recycled, if necessary after adjustment of its concentration of anolytic component by addition of a supplementary amount of anolytic component via the pipe 25, in order to constitute the solution of anolytic component supplying the anode compartment of each electrolytic cell.

At the potentials imposed in the cathode compartment of the electrolytic cell, the oxygen present in the water to be treated, which passes through the bed of the catalyst filling the said cathode compartment, is electrocatalytically reduced to water and a stream of deoxygenated water is withdrawn from the said cathode compartment via the discharge pipe. The abovementioned reduction is carried out according to the overall scheme (I), if the potential in the cathode compartment is between 0.3 volt and −0.3 volt with respect to SHE, or according to the reaction scheme (II), if the potential in the cathode compartment is between −2 volts and −0.3 volt. As the body of the catalyst is in contact with the current-conveying electrodes, the body of the catalyst has an electrocatalytic role and participates, for this reason, in the electroreduction of the oxygen. This reduction of the oxygen consumes a certain amount of the protons present in the water in the course of treatment.

At the potential imposed in the anode compartment, when the latter comprises an aqueous solution of alkaline (hydroxide) anolytic component, a portion of the $OH^-$ ions present in the said compartment, which are provided by the aqueous solution of anolytic component, is converted to oxygen according to the reaction scheme (III), which oxygen is discharged in the aqueous solution of anolytic component exiting from the anode compartment and released in the degassing vessel 20, from where it is collected via the pipe 24. For an aqueous solution of acidic or neutral anolytic component, the release of oxygen in the anode compartment corresponds to a decomposition of the water of the said solution according to the reaction scheme (IV). The amount of oxygen produced in the anode compartment is at least equal to the amount of oxygen electrocatalytically reduced in the cathode compartment. The cations of the anode compartment, which are in excess with respect to the amount required to ensure the electrical neutrality of the anodic liquid, pass through the cation-porous wall of the electrolytic cell, namely wall 2 of the cell 1 of the device in FIG. 1 or 2 or each of the cation-porous walls, respectively 102, 202, 302, 402 and 502, of the electrolytic cells, respectively 100, 200, 300, 400 and 500, of the device in FIG. 3, and pass into the cathodic compartment, where they ensure the electrical neutrality of the water moving through the cathode compartment of the said electrolytic cells.

To complete the above description, three implementation examples of the process according to the invention are given below without implied limitation.

EXAMPLE 1

Tests on the deoxygenation of sea water were carried out by using a device analogous to the device with a single electrolytic cell represented diagrammatically in FIG. 1 of the appended drawing.

The porous wall permeable only to cations separating the cathode and anode compartments of the electrolytic cell consisted of a cation-exchange membrane of the Nafion membrane type.

The catalyst filling the cathode compartment of the electrolytic cell consisted of divided platinum deposited, in the proportion of 1% by weight of the catalyst, on a support formed of grains of active charcoal having a specific surface, determined by the B.E.T. nitrogen absorption method, equal to 1200 $m^2/g$, the divided platinum being present in a surface layer of the said grains and exhibiting a dispersion D equal to 35%. As indicated in the citation WO-A-9524360, the dispersion D of platinum in the catalyst grains is defined as being the ratio of the number of platinum atoms at the surface of the grains to the total number of platinum atoms contained in the said grains.

The electrodes of the cathode type, immersed in the catalyst bed filling the cathode compartment of the electrolytic cell, were made of graphite paper, while the electrode equipping the anode compartment of the said cell was made of stainless steel.

Sea water comprising an amount of oxygen equal to $8 \times 10^{-4}\%$ by weight was treated in order to produce treated sea water having an oxygen content equal to $20 \times 10^{-7}\%$ by weight.

The sea water to be treated was introduced into the cathode compartment of the electrolytic cell and discharged from the said compartment with a flow rate of $500 \times 10^3$ kg per hour. The aqueous solution of anolytic component circulating in the anode compartment of the electrolytic cell consisted of an aqueous NaOH solution with a concentration of 0.5N, the said solution being introduced and discharged from the anode compartment with a flow rate of 25,000 kg/hour.

The electric potential established between cathodes and anode of the electrolytic cell provided for the maintenance of a potential of between +0.1 volt and −1.2 volt, with respect to SHE, in the cathode compartment. The temperature of the electrolytic cell was maintained at 15° C. during the treatment.

By way of first comparison, a deoxygenation of sea water identical to that introduced in the electrocatalytic treatment according to the invention was also carried out, up to the abovementioned oxygen content equal to $20 \times 10^{-7}\%$ by weight, by resorting to a catalytic hydrogenation by hydrogen as provided in the citation WO-A-9524360, in the presence of a catalyst identical to that used in the tests according to the invention.

By way of second comparison, a deoxygenation of sea water identical to that introduced in the electrocatalytic treatment according to the invention was again carried out, up to the abovementioned oxygen content equal to $20 \times 10^{-7}\%$ by weight, the deoxygenation being carried out as indicated in the citation U.S. Pat. No. 4,527,626, that is to say by first of all electrolysing the sea water in an electrolysis cell, in order to produce the hydrogen required for the hydrogenation, and by then bringing the stream of water comprising the said hydrogen into contact with a hydrogenation catalyst contained in a reactor separate from the electrolysis cell and in series with the latter, the said catalyst being identical to the catalyst used in the other tests.

The operating conditions specific to the various tests are collated in the table presented below.

Examination of the contents of the said table reveals that the electrocatalytic process for the deoxygenation of sea water according to the invention is more efficient than the process for deoxygenation by catalytic hydrogenation according to the citation WO-A-9524360 or than the deoxygenation process according to the citation U.S. Pat. No. 4,527,626 using an electrolysis of the water, followed by a catalytic hydrogenation, in the sense that, in order to achieve the same residual oxygen level in the treated sea water, it uses a markedly lower amount of catalyst than either of the abovementioned prior processes and it consumes, in addition, less electrical energy than the process of the citation U.S. Pat. No. 4,527,626.

TABLE

| Nature of the treatment | Electrocatalytic deoxygenation (invention) | Catalytic hydrogenation (WO-A-9524360) | Electrolysis, then hydrogenation (US-A-4,527,626) |
| --- | --- | --- | --- |
| Temperature of the reactor (° C.) | 15 | 15 | 15 | 15 |
| Current density (mA/g of catalyst) | 50 | 2 | 0 | |
| Amount of hydrogen used (kg/h) | 0 | 0 | 0.5 | 0.5 |
| Catalyst volume (m³) | 0.54 (CE = 100%) 1.08 (CE = 50%) | 13.4 (CE = 1.00%) 27 (CE = 50%) | 40 | 40 |
| Electrical power consumed for CE = 100% (kW) | 15 | 15.6 | 0 | 25.7 |

CE = coulombic efficiency

EXAMPLE 2

A test of the deoxygenation of sea water was carried out by using a device analogous to the device with a single electrolytic cell represented diagrammatically in FIG. 1 of the appended drawing.

The porous wall permeable only to cations separating the cathode and anode compartments of the electrolytic cell consisted of a cation exchange membrane of the Nafion membrane type.

The catalyst filling the cathode compartment of the electrolytic cell was composed of grains of active charcoal having a mean diameter of 2.5 mm and exhibiting a specific surface, determined by the B.E.T. nitrogen adsorption method, equal to 750 m²/g.

The electrodes of the cathode type, immersed in the catalyst bed filling the cathode compartment of the electrolytic cell, were made of graphite paper, while the electrode equipping the anode compartment of the said cell was made of titanium covered with a mixed oxide of ruthenium and titanium in a proportion of 20 m²/g of electrode.

Sea water containing an amount of oxygen equal to $8 \times 10^{-4}\%$ by weight was treated in order to produce treated sea water having an oxygen content equal to $20 \times 10^{-7}\%$ by weight.

The sea water to be treated was introduced in the cathode compartment of the electrolytic cell and discharged from the said compartment with a flow rate of $500 \times 10^3$ kg per hour. The aqueous solution of anolytic component circulating through the anode compartment of the electrolytic cell consisted of an aqueous solution of perchloric acid ($HClO_4$) with a concentration of 0.1 mol/l, the said solution being introduced and discharged from the anode compartment with a flow rate of 25,000 kg/hour.

The electric potential established between cathodes and anode of the electrolytic cell provided for the maintenance of a potential equal to −0.850 volt, with respect to SHE, in the cathode compartment. The temperature of the electrolytic cell was maintained at 11° C. during the treatment.

The specific operating conditions are collated below:

| | |
|---|---|
| temperature | 11° C. |
| flow rate into an empty drum | 0.01 m/s |
| current density/g of catalyst | 4 mA |
| amount of hydrogen used | 0 |
| catalyst volume | 13 m³ |
| | (CE = 100%) |
| electrical power | 40 kW |
| cell voltage | 3 volts |
| imposed cathode potential/SHE | −0.850 volt |

EXAMPLE 3

A test of the deoxygenation of sea water was carried out by using a device analogous to the device with a single electrolytic cell represented diagrammatically in FIG. 1 of the appended drawing.

The porous wall permeable only to cations separating the cathode and anode compartments of the electrolytic cell consisted of a cation-exchange membrane of the Nafion membrane type.

The catalyst filling the cathode compartment of the electrolytic cell consisted of divided platinum deposit, in a proportion of 1% by weight of the catalyst, on a support formed of graphite grains having a mean diameter of 2.5 mm and exhibiting a specific surface, determined by the B.E.T. nitrogen adsorption method, equal to 1 m²/g.

The electrodes of the cathode type, immersed in the catalyst bed filling the cathode compartment of the electrolytic cell, were made of graphite paper, while the electrode equipping the anode compartment of the said cell was made of titanium covered with a mixed oxide of ruthenium and of titanium in a proportion of 20 m²/g of electrode.

Sea water containing an amount of oxygen equal to $8 \times 10^{-4}\%$ by weight was treated in order to produce treated sea water having an oxygen content equal to $20 \times 10^{-7}\%$ by weight.

The sea water to be treated was introduced in the cathode compartment of the electrolytic cell and discharged from the said compartment with a flow rate of $500 \times 10^3$ kg per hour. The aqueous solution of anolytic component, circulating through the anode compartment of the electrolytic cell, consisted of an aqueous solution of orthophosphoric acid ($H_2PO_4$) with a concentration of 0.4 mol/l, the said solution being introduced and discharged from the anode compartment with a flow rate of 25,000 kg/hour.

The electric potential established between cathodes and anode of the electrolytic cell provided for the maintenance of a potential equal to −0.550 volt, with respect to SHE, in the cathode compartment. The temperature of the electrolytic cell was maintained at 11° C. during the treatment.

The specific operating conditions are collated below:

| | |
|---|---|
| temperature | 11° C. |
| flow rate into an empty drum | 0.1 m/s |
| current density/g of catalyst | 3 mA |
| amount of hydrogen used | 0 |
| catalyst volume | 5 m³ |
| | (CE = 100%) |
| electrical power | 37 kW |
| cell voltage | 2.8 volts |
| imposed cathode potential/SHE | −0.550 volt |

What is claimed is:

1. An electrocatalytic process for the deoxygenation of water from various sources said process comprising the steps of:

simultaneously generating an electric field in a stream of water and contacting the stream of water, with a catalyst in the same reaction volume by passing the stream of water continuously through a bed of the catalyst placed in a cathode compartment of an electrolytic cell which comprises the cathode compartment and an anode compartment which are provided, in the case of the former, with at least one electrode operating as a cathode and, in the case of the latter, with at least one electrode operating as an anode and which are separated by a wall permeable only to cations, the catalyst being electrically conducting;

passing a conductive aqueous solution of an anolytic component composed of at least one compound chosen from alkali metal hydroxides, acids and alkali metal or alkaline earth metal salts continuously into the anode compartment of the electrolytic cell, the said aqueous solution having a concentration of anolytic component of between 0.01 mol and 5 mol per liter;

establishing an electric potential between the cathode and the anode of the electrolytic cell by maintaining the local electrode potential of the cathode compartment at values, with respect to the standard hydrogen electrode, of between +0.3 volt and −2 volts, in order to consume, in the cathode compartment, the oxygen dissolved in the stream of water being treated, and under conditions such that the potential of the anode compartment takes values, with respect to the standard hydrogen electrode, greater than 0.4 volt, in order to decompose an amount of the aqueous anolytic component solution appropriate for allowing the passage, into cathode compartment, of the required amount of cations for ensuring the electrical neutrality of the treated stream of water exiting from the cathode compartment.

2. The process according to claim 1, wherein the catalyst comprises an active phase which comprises at least one metal and which is deposited on an electrically conducting support.

3. The process according to claim 2, wherein the active phase of the catalyst is based on at least one metal chosen from platinum, palladium, rhodium, iridium and iron.

4. The process according to claim 2, wherein the amount by weight of the metal or of the metals in the catalyst represents 0.05% to 5% of the weight of the catalyst.

5. The process according to claim 4, wherein the amount by weight of the metal or of the metals in the catalyst represents 0.1% to 2% of the weight of the catalyst.

6. The process according to claim 2, wherein the conductive support of the catalyst is made of a material chosen from active charcoal, graphite, silicon carbide, heavy metal carbides, silicon nitride, heavy metal nitrides, mixtures of active charcoal and of graphite, cokes, coal or petroleum pitches, stainless steel, metals and metal alloys.

7. The process according to claim 1, wherein the catalyst consists essentially of carbon.

8. The process according to claim 7, wherein the catalyst consists essentially of active charcoal.

9. The process according to claim 1, wherein the cathode potential at which the catalyst is maintained is between 0.0 volt and −1.0 volt with respect to the standard hydrogen electrode.

10. The process according to claim 1, wherein the anode potential at which the aqueous solution of anolytic component is maintained in the anode compartment is between 0.4 volt and 2 volts with respect to the standard hydrogen electrode.

11. The process according to claim 1, wherein the concentration of anolytic component in the aqueous solution of anolytic component is between 0.05 mol and 2 mol per liter.

12. The process according to claim 1, wherein the aqueous solution of anolytic component moves in a closed circuit from the anode compartment of the electrolytic cell, passing through a degassing region in which it is freed from the oxygen which it dissolved during the decomposition in the anode compartment, in order to return to the said anode compartment.

13. The process according to claim 12, wherein the concentration of anolytic component is kept constant in the anode compartment by addition of a supplementary amount of anolytic component to the degassed solution recycled to the anode department.

14. The process according to claim 1, wherein the anolytic component is chosen from sodium hydroxide, potassium hydroxide, perchloric acid, orthophosphoric acid and the sodium or potassium salts of the said acids.

15. The process according to claim 1, wherein the cation-permeable wall is a wall of the mechanical separator type or a wall of the cation-exchange polymer membrane type.

16. The process according to claim 15, wherein the cation-permeable wall is a ceramic wall.

17. The process according to claim 1, wherein the treatment of the water in the electrolytic cell is carried out at temperatures of between 0° C. and 50° C.

18. The process according to claim 1, wherein the difference in potential or voltage established between the cathode and the anode of the electrolytic cell has a constant value or a value which varies as a function of time.

19. The process according to claim 1, wherein the difference in potential or voltage established between the cathode and the anode of the electrolytic cell varies cyclically, continuously or non-continuously, as a function of time.

20. An electrocatalytic device for the deoxygenation of water from various sources comprising a plurality of electrolytic cells, each cell comprising a cathode compartment and an anode compartment which are separated by a cation-permeable wall, the cathode compartment being provided with an inlet connected to a pipe for introduction of the water to be treated and with an outlet connected to a pipe for discharge of liquid and being equipped with at least one electrode suitable for acting as cathode and the anode compartment being provided with a pipe for introduction of liquid and with a pipe for discharge of liquid and being equipped with at least one electrode suitable for acting as anode, wherein the cathode compartment of each electrolytic cell additionally comprises a bed of a catalyst for reduction of oxygen to water which is placed between the inlet and the outlet of the cathode compartment and which is composed of carbon, or of a catalyst composed of an active phase which comprises at least one metal and which is deposited on an electrically conducting support, wherein the electrolytic cells of the plurality of electrolytic cells operate in parallel, the pipes for introduction of water to be treated and the pipes for discharge of treated water equipping the cathode compartments of the cells are connected, in the case of the former, to a common pipe for supplying with water to be treated and, in the case of the latter, to a common pipe for discharge of treated water, whereas the pipes for introduction of liquid and the pipes for discharge of liquid equipping the anode compartments of the said cells are connected, in the case of the former, to a common pipe for introduction of anodic liquid and, in the case of the latter, to a common pipe for discharge of anodic liquid and, in addition, the electrodes of the cathode compartments and the electrodes of the anode compartments can be connected, in the case of the former, to the negative pole and in the case of the latter, to the positive pole of an appropriate current generator.

21. The device according to claim 20, further comprising a degassing vessel provided with an inlet and with an outlet for the liquids and, at the top, with an outlet for the gases, the said inlet and the said outlet for the liquids being connected respectively, to the common pipe for discharge and to the common pipe for introduction of anodic liquid.

22. The device according to claim 21, wherein a pipe for introduction of a supplementary liquid is fitted as a branch pipe on the common pipe for introduction of anodic liquid.

23. The device according to claim 20, wherein the pipe for introduction of liquid equipping the anode compartment of each electrolytic cell is arranged on the same side of the said cell as the pipe for discharge of water equipping the cathode compartment, whereas the pipe for discharge of liquid from the anode compartment is situated on the same side of the cell as the pipe for the introduction of water equipping the cathode compartment, so that the water passing through the cathode compartment moves countercurrentwise to the liquid passing through the anode compartment.

24. The device according to claim 20, wherein each cell of the plurality of cells is provided in the form of a parallel-piped cell with a thickness t, length l, and width w, the cation-permeable wall separating the cathode and anode compartments of the cell being arranged parallel to the main faces of the parallel-piped, while the main face on the side of the cathode compartment is arranged in order to constitute a cathode and while the main face on the side of the anode compartment is arranged in order to firm an anode and while the parallel-piped cells are joined together, main face against main face, so that the adjacent compartments of two consecutive cells are both cathode compartments or both anode compartments.

25. The device according to claim 24 wherein the length l, width w and thickness t of each parallel-piped cell are such that the ratio w:l is between 0.1:1 and 1:1 and that the ratio t:l is between 0.005:1 and 0.1.1.

26. The device according to one of claims 20 to 25, wherein the electrodes equipping the cathode and anode compartments of the electrolytic cell or of each electrolytic cell are made of an electrically conducting material which is inert with respect to reaction mixtures present in the cathode and anode compartments.

27. The device according to claim 26, wherein the said electrodes are provided in the form of perforated or non-perforated plates or of grids arranged parallel or perpendicular to the cation-permeable wall separating the anode and cathode compartments of the electrolytic cell under consideration.

* * * * *